US011964853B2

(12) United States Patent
Mohlman et al.

(10) Patent No.: US 11,964,853 B2
(45) Date of Patent: Apr. 23, 2024

(54) OBSTACLE DETECTION SYSTEM FOR AN AERIAL WORK PLATFORM

(71) Applicant: JLG Industries, Inc., McConnellsburg, PA (US)

(72) Inventors: Brian K. Mohlman, Hagerstown, MD (US); Matthew I. Gilbride, Frederick, MD (US); David W. Lombardo, Walkersville, MD (US); Ignacy Puszkiewicz, Hagerstown, MD (US)

(73) Assignee: JLG Industries, Inc., McConnellsburg, PA (US)

( * ) Notice: Subject to any disclaimer, the term of this patent is extended or adjusted under 35 U.S.C. 154(b) by 0 days.

(21) Appl. No.: 18/197,155

(22) Filed: May 15, 2023

(65) Prior Publication Data

US 2023/0278842 A1 Sep. 7, 2023

Related U.S. Application Data

(63) Continuation of application No. 17/847,543, filed on Jun. 23, 2022, now Pat. No. 11,673,784, which is a
(Continued)

(51) Int. Cl.
*B66F 11/04* (2006.01)
*B66F 7/06* (2006.01)
(Continued)

(52) U.S. Cl.
CPC .......... *B66F 11/046* (2013.01); *B66F 7/0666* (2013.01); *B66F 9/0755* (2013.01);
(Continued)

(58) Field of Classification Search
CPC .... B66F 11/046; B66F 7/0666; B66F 9/0755; B66F 11/042; B66F 17/006; G05B 2219/45071
See application file for complete search history.

(56) References Cited

U.S. PATENT DOCUMENTS 3,670,849 A 6/1972 Milner, Jr.
3,814,211 A 6/1974 Pamer
(Continued)

FOREIGN PATENT DOCUMENTS

EP 1 452 479 9/2004
JP 5-65994 8/1993
(Continued)

OTHER PUBLICATIONS

Australian Examination Report No. 1 dated Aug. 3, 2018 issued in Australian Patent Application No. 2018201310, 8 pp.
(Continued)

*Primary Examiner* — Mathew Franklin Gordon
(74) *Attorney, Agent, or Firm* — Foley & Lardner LLP

(57) ABSTRACT

A platform assembly includes a work platform including a platform floor and a safety rail extending from the platform floor to a rail height, and a primary sensor unit secured to the work platform and positioned adjacent one of the platform floor and the safety rail. The primary sensor unit is configured to monitor an area from the platform floor or from the safety rail to a space above the rail height and forward and aft of the work platform. The platform assembly enhances protection for an operator from sustained involuntary operation resulting in an impact with an obstruction or structure.

19 Claims, 4 Drawing Sheets

Related U.S. Application Data continuation of application No. 15/904,682, filed on Feb. 26, 2018, now Pat. No. 11,383,963.

(60) Provisional application No. 62/466,501, filed on Mar. 3, 2017.

(51) Int. Cl.
  *B66F 9/075* (2006.01)
  *B66F 17/00* (2006.01)

(52) U.S. Cl.
  CPC .......... *B66F 11/042* (2013.01); *B66F 17/006* (2013.01); *G05B 2219/45071* (2013.01)

(56) References Cited

U.S. PATENT DOCUMENTS

| | | |
|---|---|---|
| 4,931,930 A | 6/1990 | Shyu et al. |
| 4,979,588 A | 12/1990 | Pike et al. |
| 5,004,997 A | 4/1991 | Shisgal et al. |
| 5,359,542 A | 10/1994 | Pahmeier et al. |
| 5,363,940 A | 11/1994 | Fahrion |
| 5,548,515 A | 8/1996 | Pilley et al. |
| 5,607,282 A | 3/1997 | Brannen et al. |
| 5,740,047 A | 4/1998 | Pilley et al. |
| 5,889,479 A | 3/1999 | Tabel |
| 5,906,648 A | 5/1999 | Zoratti et al. |
| 5,940,012 A | 8/1999 | Studebaker |
| 6,294,985 B1 | 9/2001 | Simon |
| 6,462,697 B1 | 10/2002 | Klamer et al. |
| 6,991,067 B2 | 1/2006 | Dube et al. |
| 7,194,358 B2 | 3/2007 | Callaghan et al. |
| 8,016,074 B2 | 9/2011 | Black et al. |
| 9,586,799 B2 | 3/2017 | Hao et al. |
| 10,029,899 B2 | 7/2018 | Hao et al. |
| 10,124,999 B2 | 11/2018 | Puszkiewicz et al. |
| 10,358,331 B2 | 7/2019 | Lombardo et al. |
| 10,549,975 B2 | 2/2020 | Wicklund et al. |
| 11,383,963 B2 | 7/2022 | Mohlman et al. |
| 2002/0074186 A1 | 6/2002 | Baldas et al. |
| 2003/0020610 A1 | 1/2003 | Swanson et al. |
| 2003/0122666 A1 | 7/2003 | John et al. |
| 2003/0189487 A1 | 10/2003 | Mathews et al. |
| 2003/0221916 A1 | 12/2003 | Dube et al. |
| 2004/0094077 A1 | 5/2004 | Stone |
| 2005/0187712 A1 | 8/2005 | Callaghan et al. |
| 2015/0368082 A1 | 12/2015 | Davis et al. |
| 2016/0098910 A1 | 4/2016 | Cummings et al. |
| 2017/0233232 A1 | 8/2017 | Davis |
| 2020/0095105 A1 | 3/2020 | Yutzy et al. |
| 2022/0227614 A1 | 7/2022 | Yutzy et al. |
| 2022/0315404 A1 | 10/2022 | Mohlman et al. |

FOREIGN PATENT DOCUMENTS

| | | |
|---|---|---|
| JP | 2011-63352 | 3/2011 |
| JP | 2013-10589 | 1/2013 |

OTHER PUBLICATIONS

Extended European Search Report dated Jul. 24, 2018 issued in European Patent Application No. 18159117.3, 7 pp.

Japanese Office Action dated Mar. 19, 2019 issued in Japanese Patent Application No. 2018-037181 and English translation, 15 pp.

OBSTACLE DETECTION SYSTEM FOR AN AERIAL WORK PLATFORM

CROSS-REFERENCES TO RELATED APPLICATIONS

This application is a continuation of U.S. patent application Ser. No. 17/847,543, filed Jun. 23, 2022, pending, which is a continuation of U.S. patent application Ser. No. 15/904,682, filed Feb. 26, 2018 (now U.S. Pat. No. 11,383,963, issued Jul. 12, 2022), which claims the benefit of U.S. Provisional Patent Application Ser. No. 62/466,501, filed Mar. 3, 2017, the entire contents of each of which are hereby incorporated by reference in this application.

STATEMENT REGARDING FEDERALLY SPONSORED RESEARCH OR DEVELOPMENT (NOT APPLICABLE)

BACKGROUND

The invention relates to work platforms and, more particularly, to a work platform including provisions to enhance protection for an operator from sustained involuntary operation resulting in an impact with an obstruction or structure.

Aerial lifts with a work platform supported on an extendable boom have been fitted with sensor systems for preventing or minimizing the impact of overhead crush accidents. With an extendable boom, a safety hazard can occur when an operator is positioned between the platform and a structure that may be located overhead or behind the operator, among other places. A platform may be maneuvered into a position where the operator is crushed between that structure and the platform, resulting in serious injury or death.

Scissor lifts are less susceptible to such safety hazards due to the nature of machine limitations to vertical movement of the platform. An overhead impact hazards still exists, however, and it would be desirable to provide a platform assembly that can detect potential obstacles and hazards with such a machine.

BRIEF SUMMARY

The platform assembly of the described embodiments may incorporate one or more sensor units positioned on an exterior surface of the work platform adjacent the platform floor. The sensors may be configured to provide "fans" of coverage for detecting potential obstacles in a vicinity of the platform. In some embodiments, extendable platforms are accommodated by incorporating an additional sensor looking downward to prevent a potential crushing hazard on any objects/structures below the platform extension in an extended position.

In an exemplary embodiment, a platform assembly includes a work platform including a platform floor and a safety rail extending from the platform floor to a rail height, and a primary sensor unit secured to the work platform and positioned adjacent the platform floor. The primary sensor unit is configured to monitor an area from the platform floor to a space above the rail height and forward and aft of the work platform.

The primary sensor unit may also include two sensors facing in substantially opposite directions, each of the sensors defining a fan of coverage. In this context, the sensors may be positioned relative to each other such that the fans of coverage at least partially overlap. In some embodiments, the two sensors may be oriented about 90° relative to each other. The work platform may be rectangular shaped with two long sides and shorter front and back ends, and the primary sensor unit may be positioned on at least one of the two long sides.

The work platform may also include a platform extension that may be displaceable between a retracted position and an extended position and that extends the platform floor in at least one of a forward and a rearward direction in the extended position. The platform assembly may additionally include a secondary sensor unit positioned adjacent the platform extension and configured to monitor an area below the platform extension. In this context, the platform assembly may also include a target panel positioned on the platform extension and displaceable with the platform extension. The target panel may be in a sight line of the secondary sensor in the extended position, and the target panel may be out of the sight line of the secondary sensor in the retracted position.

In another exemplary embodiment, a scissor lift includes a wheeled chassis, an arm stack supported on the wheeled chassis and displaceable between a raised orientation and a lowered orientation, and the platform assembly of the described embodiments supported on the arm stack and displaceable with the arm stack.

In yet another exemplary embodiment, a platform assembly includes a work platform including a platform floor, two long sides, and a safety rail extending from the platform floor to a rail height, and two primary sensor units secured to the work platform and positioned adjacent the platform floor on each of the two long sides, respectively. The primary sensor units are configured to monitor an area from the platform floor to a space above the rail height and forward and aft of the work platform. The primary sensor units each comprise two sensors facing in substantially opposite directions, each of the sensors defining a fan of coverage.

BRIEF DESCRIPTION OF THE DRAWINGS

These and other aspects and advantages will be described in detail with reference to the accompanying drawings, in which.

DETAILED DESCRIPTION

With reference to the drawings, the platform assembly according to the described embodiments is shown with an exemplary application to a scissor lift. It will be appreciated that the platform assembly may be applicable to other lift vehicle types, and the invention is not necessarily meant to be limited to the exemplary scissor lift application shown and described.

The scissor lift shown in FIGS. 1-4 includes a wheeled chassis 12, an arm stack 14 supported on the wheel chassis 12 and displaceable between a raised orientation and a lowered orientation, and a platform assembly 16 supported on the arm stack via a platform base 18 that is displaceable with the arm stack 14.

Figure 1:
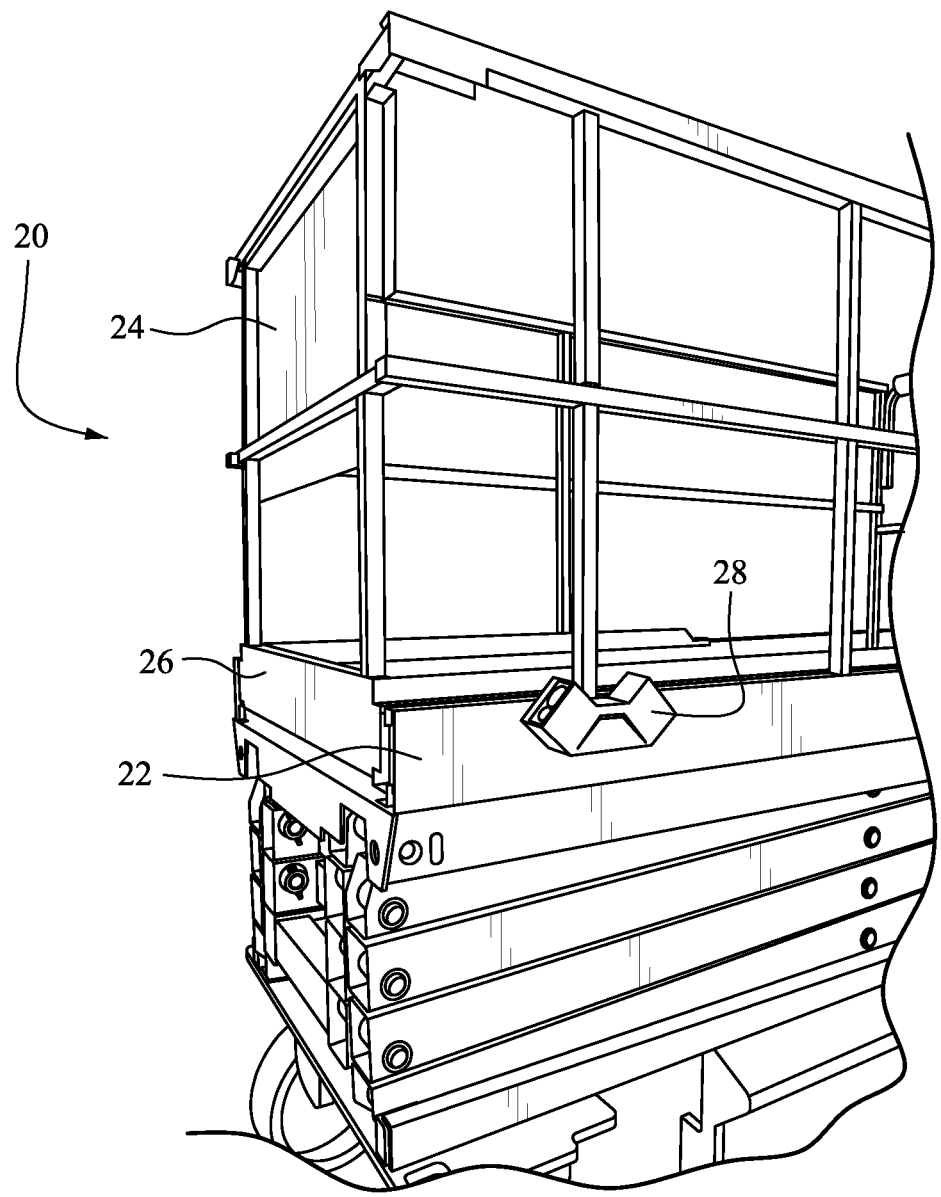
FIGS. 1 and 2 show an exemplary platform assembly including a sensor unit.
Figure 2:
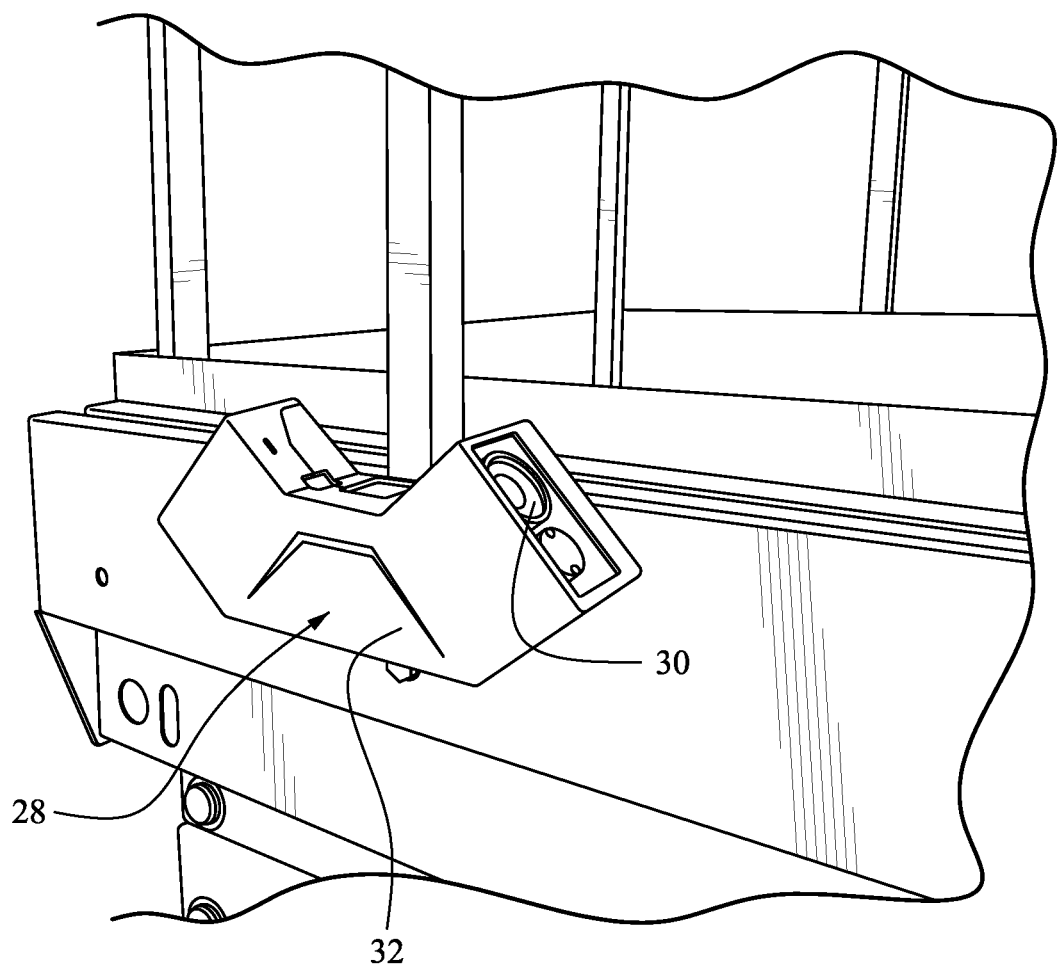
Figure 3:
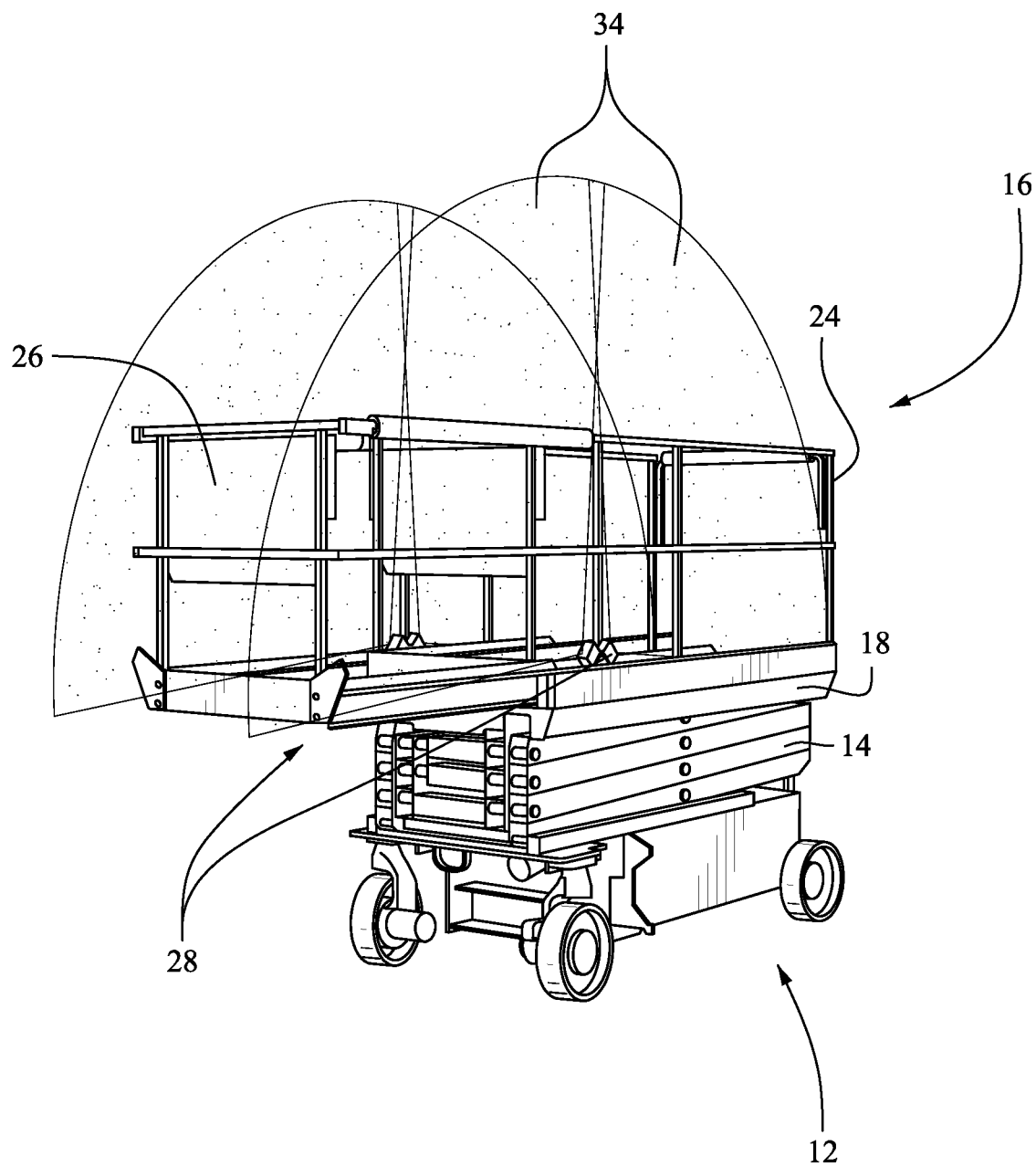
FIG. 3 illustrates the fans of coverage by the sensor units.

The platform assembly 16 includes a work platform 20 with a platform floor 22 and a safety rail 24 extending from the platform floor to a rail height. The work platform 20 may also include a platform extension 26 that is displaceable between a retracted position (FIG. 1) and an extended position (FIG. 3). The platform extension 26 extends the platform in at least one of a forward and a rearward direction in the extended position. In some embodiments, the work platform 20 may include platform extensions 26 at both forward and aft ends. The platform extension 26 telescopes with complementary structure on the platform as is known.

The platform assembly 16 may also include a primary sensor unit 28 secured to the work platform 20. As shown, the primary sensor unit 28 may be positioned on an exterior surface of the work platform 20 adjacent the platform floor 22. With a rectangular shaped platform 20 including two long sides and shorter front and back ends, the primary sensor unit 28 may be positioned on one or both of the long sides.

In some embodiments, each of the primary sensor units 28 includes two sensors 30 facing in substantially opposite directions, where each of the sensors 30 defines a fan of coverage. The sensors 30 detect the presence of a potential obstacle in the detection zone and output a signal to the machine control system. The sensors may use radar, LiDAR or other suitable detection technology. A suitable sensor is the LeddarVu Vu8, available from LeddarTech in Quebec City, Canada.

The sensors 30 are secured within a sensor housing 32 that may be clamped to existing structure and can be positioned depending on the particular application and targeted protection zone(s). The sensors 30 in the housing 32 are oriented about 90° relative to each other. Relative to horizontal (or relative to the platform floor 22), a forward-facing sensor may be angled about 45° relative to horizontal, and a rearward-facing sensor may be angled about 135° (or 45° from the opposite direction) relative to horizontal.

It is desirable to position the sensors 30 in the housing 32 relative to each other such that the fans of coverage at least partially overlap. FIG. 3 shows the overlapping fans of coverage 34. The coverage area may fall between 90-110°. The fans are generally narrow (e.g., 2-5°), and with the sensors 30 close to the platform floor 22, the sensors 30 also cover the area above the platform while also looking forward and to the rear of the machine. Specifically, the sensors are configured to monitor an area from the platform floor 22 to a space above the rail height and forward and aft of the work platform as shown in FIG. 3.

In the exemplary application shown in FIG. 3, the sensor units 28 are positioned on both long sides of the platform in a generally central position relative to the platform with the platform extension 26 in its extended position. To accommodate the platform extension 26, the sensor units 28 are positioned slightly off center (i.e., forward or aft of center) without the platform extension 26 adjacent the platform floor 22.

Figure 4:
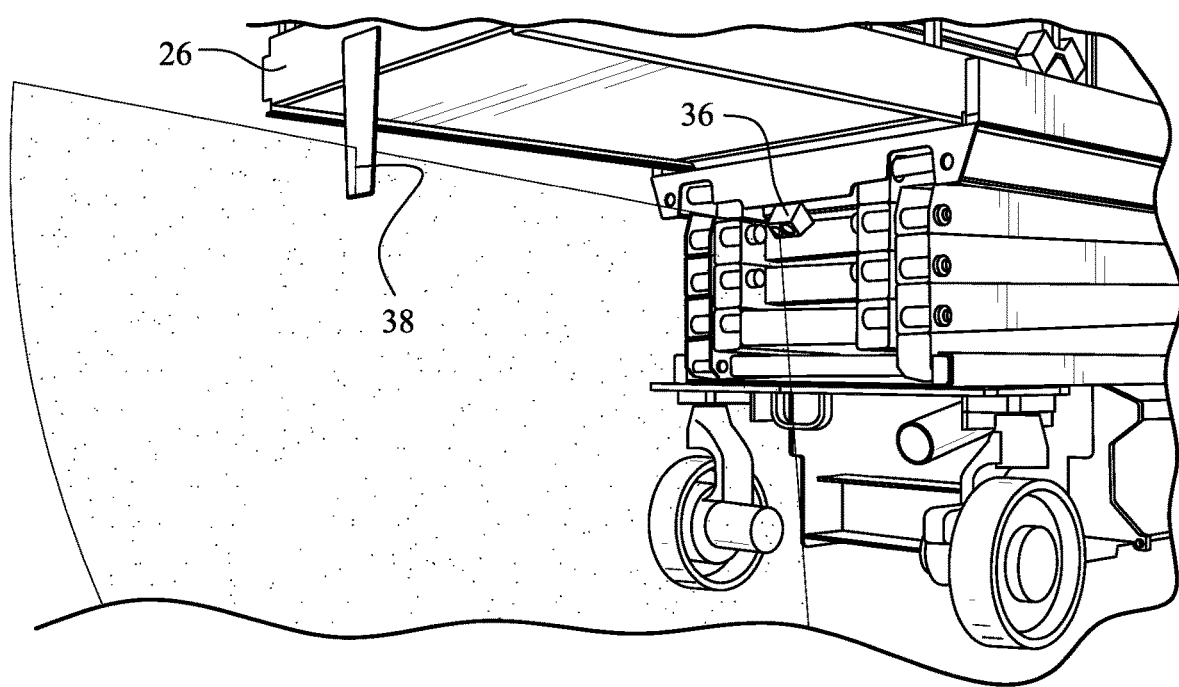
FIG. 4 shows a secondary sensor for the platform extension.

With reference to FIG. 4, the platform assembly may also be provided with a secondary sensor unit 36 positioned adjacent the platform extension 26 and configured to monitor an area below the platform extension 26. As shown, the secondary sensor 36 is fixed relative to the platform extension 26 and may be mounted to the platform base 18. The secondary sensor 36 serves to prevent a potential crushing hazard on any objects/structures below the platform extension 26 in its extended position as shown.

A target panel 38 may be positioned on the platform extension 26 and displaceable with the platform extension 26. The target panel 38 is in a sight line of the secondary sensor 36 with the platform extension 26 in its extended position, whereas the target panel 38 is out of the sight line of the secondary sensor 36 when the platform extension 26 is in the retracted position. The target panel 38 thus allows the sensor 36 to know if the platform extension 26 is extended or retracted. Additional sensors that are positioned and configured to monitor the area below the platform can be utilized to detect objects that are close to the scissor lift (for example when working around sensitive objects like airplanes, glass walls, etc.) and to measure platform height.

In use, the driving components of the vehicle that are cooperable with the lifting assembly for lifting and lowering the work platform are controlled by an operator input implement on a control panel and by a driving/control system communicating with the driving components and the control panel. The control system also receives a signal from the sensor unit(s) 28 and controls operation of the driving components based on signals from the operator input implement and the sensor unit(s) 28. At a minimum, the control system is programmed to shut down driving components when the sensor units 28 detect an obstacle within the coverage area. Alternatively, the control system may reverse the last operation when an obstacle is detected.

If function cutout is selected, when an obstacle is detected, the active function will be stopped immediately, and all non-active functions shall not be activated. If a reversal function is selected, when an obstacle is detected during operation, the operation required RPM target is maintained, and the active function only when an obstacle is detected is reversed until the reversal function is stopped. A ground horn and a platform horn can be activated when the reversal function is active. After the reversal function is completed, engine RPM is set to low, and all functions are disabled until the functions are re-engaged for example with a foot switch and operator controls. The system may include a sensor override button that is used to override the function cut out initiated by the sensor units. If the override button is pressed and held, it enables the lift functions if the foot switch and controls are re-engaged sequentially. In this event, function speed is set in creep mode speed automatically. The controller is programmed to avoid the cut out feature being disabled before the obstacle is detected regardless of whether the override button is pressed or released. This assures that the cut out feature will still be available if the override button is stuck or manipulated into an always-closed position.

The reversal function is implemented for various operating parameters of the machine. If a drive forward request is received when an obstacle is detected, it is treated as a bump or obstacle in the road and will not trigger the reversal function. Reversal function terminates based on the sensor signal, footswitch signal and time parameters that are set for different functions, respectively. If the sensor signal changes from obstacle-detected status to no-obstacle-detected status before the maximum reversal time is elapsed, then the reversal function will be stopped; otherwise, the reversal function is active until the maximum reversal time is elapsed.

Disengaging the footswitch also terminates the reversal function at any time.

If an operator is trapped on the platform, ground control can be accessed from the ground via a switch. In the ground control mode, if the platform switch is engaged, platform operation may be allowed in creep speed. If the sensor units change status from obstacle to no obstacle, then operation is maintained in creep speed unless the ground enable and function control switch is re-engaged.

The platform assembly of the described embodiments incorporates strategically placed sensors for detecting potential obstacles and crushing hazards. Although shown with an application to a scissor lift, the platform assembly is applicable to other work platforms and the like. The platform assembly including the described sensor units serves to enhance protection for an operator from sustained involuntary operation resulting in an impact with an obstruction or structure.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A lift device comprising:
a chassis;
a lift device supported on the chassis;
a platform including a platform floor supported on the lift device, wherein the platform is displaceable by the lift device between a raised position and a lowered position;
a rail at least partially surrounding the platform;
a plurality of sensors secured to the platform; and
a control system in communication with the lift device and in communication with the plurality of sensors,
wherein at least one of the plurality of sensors is positioned adjacent the platform floor and is oriented to sense objects or obstacles above the platform.

2. A lift device according to claim 1, wherein at least one of the plurality of sensors is oriented to sense objects or obstacles below the platform.

3. A lift device according to claim 1, wherein the control system is programmed to restrict operation of the lift device based on signals from the plurality of sensors.

4. A lift device according to claim 1, wherein the control system is programmed to operate an alert when an object or obstacle is detected by one of the plurality of sensors.

5. A lift device according to claim 1, wherein the platform comprises a platform extension that is displaceable between a retracted position and an extended position.

6. A lift device according to claim 5, further comprising an extension sensor that is configured to detect objects or obstacles below the platform extension.

7. A lift device according to claim 5, further comprising an extension sensor that is configured to detect whether the platform extension is extended.

8. A lift device according to claim 1, wherein the plurality of sensors comprise LiDAR sensors.

9. A lift device according to claim 1, wherein the plurality of sensors comprise sensors positioned on each side of the platform.

10. A lift device according to claim 1, wherein the control system is programmed to shut down active functions when an object or obstacle is detected by one of the plurality of sensors.

11. A lift device according to claim 1, wherein the control system is programmed to reverse a last operation when an object or obstacle is detected by one of the plurality of sensors.

12. A lift device according to claim 11, wherein the control system is further programmed to disable all functions after the last operation is reversed until the functions are re-engaged with a user switch and/or operator controls.

13. A lift device according to claim 12, further comprising an override button that is configured to override the disabling of all functions, the override button being further configured to enable lift functions if the user switch and/or operator controls are re-engaged sequentially.

14. A lift device according to claim 13, wherein the control system is programmed to set function speed in creep mode and is programmed to avoid the disabling of all functions being deactivated before the object or obstacle is detected regardless of whether the override button is pressed or released.

15. A lift device comprising:
a chassis;
a lift device supported on the chassis;
a platform supported on the lift device, wherein the platform is displaceable by the lift device between a raised position and a lowered position;
a rail surrounding the platform and extending to a rail height;
a sensor unit secured to the platform, the sensor unit comprising two sensors oriented in substantially opposite directions, wherein each of the two sensors defines a fan of coverage that extends from a platform floor to an area above the rail height; and
a control system in communication with the lift device and in communication with the sensor unit.

16. A lift device according to claim 15, wherein the platform comprises a platform extension that is displaceable between a retracted position and an extended position.

17. A lift device according to claim 16, further comprising an extension sensor that is configured to detect objects or obstacles below the platform extension.

18. A lift device according to claim 16, further comprising an extension sensor that is configured to detect whether the platform extension is extended.

19. A lift device according to claim 15, wherein at least one the sensors is a LiDAR sensor.

* * * * *